United States Patent
Evans et al.

(10) Patent No.: US 6,655,233 B2
(45) Date of Patent: Dec. 2, 2003

(54) SPEED CONTROL FOR A UTILITY VEHICLE

(75) Inventors: Mark David Evans, Grovetown, GA (US); Joseph Gerard Burgart, Martinez, GA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/905,272

(22) Filed: Jul. 13, 2001

(65) Prior Publication Data

US 2003/0010152 A1 Jan. 16, 2003

(51) Int. Cl.[7] ............................ F16H 47/02; B60K 41/16
(52) U.S. Cl. ........................... 74/731.1; 477/38; 477/42
(58) Field of Search ........................... 477/37, 38, 42; 74/730.1, 731.1; 701/93; 475/72, 76, 77, 79, 81, 83

(56) References Cited

U.S. PATENT DOCUMENTS

| | | | |
|---|---|---|---|
| 3,842,694 A | * 10/1974 | Marlow | 475/83 X |
| 4,046,029 A | * 9/1977 | Sugden | 475/72 |
| 4,046,213 A | 9/1977 | Larson | |
| 4,246,806 A | * 1/1981 | Reynolds et al. | 475/81 |
| 4,282,711 A | 8/1981 | Branstetter | |
| 4,530,416 A | 7/1985 | Kassai | |
| 4,648,803 A | 3/1987 | Stephenson et al. | |
| 4,941,371 A | * 7/1990 | Koyama et al. | 475/76 |
| 4,947,952 A | 8/1990 | Kajiwara | |
| 5,337,629 A | * 8/1994 | Kita | 475/72 |
| 5,529,546 A | * 6/1996 | Ishino et al. | 475/76 |
| 5,553,453 A | 9/1996 | Coutant et al. | |
| 5,560,203 A | 10/1996 | Pollman | |
| 5,682,315 A | * 10/1997 | Coutant et al. | 475/76 X |
| 5,703,345 A | 12/1997 | Gollner et al. | |
| 5,740,083 A | * 4/1998 | Anderson et al. | 701/93 X |
| 5,835,877 A | * 11/1998 | Unuvar et al. | 701/93 X |
| 5,931,758 A | * 8/1999 | Walter | 475/72 |
| 5,967,927 A | * 10/1999 | Imamura et al. | 475/72 X |
| 5,971,888 A | 10/1999 | Goode | |
| 5,995,895 A | * 11/1999 | Watt et al. | 701/93 X |
| 6,002,976 A | 12/1999 | Hollstein et al. | |
| 6,022,292 A | 2/2000 | Goodnight | |
| 6,202,783 B1 | 3/2001 | Taylor et al. | |
| 6,226,588 B1 | * 5/2001 | Teramura et al. | 701/93 X |

OTHER PUBLICATIONS

1995 Nissan Maxima Owners Manual, cover, pp. 4–11, 4–12.

* cited by examiner

Primary Examiner—Richard M. Lorence
Assistant Examiner—Ha Ho
(74) Attorney, Agent, or Firm—Polit & Erickson, LLC

(57) ABSTRACT

A cruise control system for a utility vehicle, which is speed-controlled by a hydrostatic transmission, includes a controller having an input for receiving a selectable set speed signal, and an output for sending a speed control signal to at least one proportional valve of a hydrostatic transmission servo control system. The vehicle ground speed is continuously monitored by a speed sensor operatively associated with a rotating gear in the vehicle drive train that rotates in proportion to vehicle ground speed, to create a ground speed signal. The selectable set speed signal can be input to controller memory by driving the vehicle at a desired ground speed and then activating a speed set switch. The speed control algorithm of the controller thereafter compares the set speed to the ground speed signal from the speed sensor and corrects the control signal to the proportional valve to correct hydrostatic transmission speed output.

19 Claims, 6 Drawing Sheets

SPEED CONTROL FOR A UTILITY VEHICLE

TECHNICAL FIELD OF THE INVENTION

The invention relates to agricultural or industrial vehicles and particularly to speed control of such utility vehicles. Particularly, the invention relates to speed control of a utility vehicle that incorporates a hydrostatic transmission as an operator-controlled speed-adjusting component of the vehicle drive train.

BACKGROUND OF THE INVENTION

Agricultural or industrial utility vehicles typically utilize a drive train having an engine driving a hydrostatic transmission that drives a final drive transmission or range transmission of the vehicle. The final drive transmission drives at least one wheel. JOHN DEERE Series 4000 tractors, available from John Deere Commercial Products, include such drive trains. The vehicle speed is typically operator-modulated by changing the drive ratio of the hydrostatic transmission via movement of a foot pedal. The drive ratio is changed by changing the angle of a swashplate of a variable displacement pump of the hydrostatic transmission.

Prior utility vehicles implement speed control or cruise control by various methods of setting and holding the swashplate angle of the variable displacement pump. In hydrostatic transmissions that are operator-modulated by mechanical displacement controls, cruise control devices have included electromagnets or friction plates to hold levers or pedals at a selected position corresponding to the desired speed. Electronically controlled hydrostatic transmissions usually hold the displacement of the variable displacement pump by maintaining a set electrical current to electro-hydraulic proportional pressure reducing valves which are used to control the swashplate angle.

In some hydrostatic transmission speed control systems, the vehicle speed is controlled by maintaining a constant energizing current set point to the proportional valves of the hydrostatic transmission. These systems are referred to as "open loop" systems, i.e., there is no mechanical feedback of the swashplate position. Hydrostatic transmission pumps that lack mechanical feedback control of the swashplate position cannot maintain constant ground speed for all conditions, simply by maintaining a level of electrical energizing current to the proportional valves. For example, increased load on the vehicle will result in a reduced speed due to engine speed changes or transmission efficiency changes.

In some other systems, swashplate mechanical position feedback control is provided. In these systems, the loads that tend to change the pump displacement by changing the swashplate angle are countered by swashplate mechanical position feedback control, so ground speed can be maintained by increasing or decreasing control current to the proportional valves in response to the mechanical position feedback control. However, this system provides a control loop that only maintains swashplate angle. The ground speed of the vehicle cannot be ensured by the control loop, as the control loop does not compensate for engine speed changes or transmission efficiency changes caused by load changes.

The present inventors have recognized the desirability to implement speed control in a hydrostatic transmission whereby swashplate mechanical position feedback control is not require. The present inventors have recognized the desirability of providing a speed control system, which is minimally affected by engine speed changes, or transmission efficiency changes caused by load changes. The present inventors have also recognized the desirability of providing an effective method of increasing or decreasing the speed set point for both slow and fast vehicle speeds.

SUMMARY OF THE INVENTION

This invention implements a speed control or cruise control system for a utility vehicle that is speed-modulated by a hydrostatic transmission. The speed control system includes a controller, such as a microcontroller having an input for receiving a selectable set speed signal, and an output for sending a speed control signal to at least one proportional valve of the hydrostatic transmission servo control system. The vehicle ground speed is continuously monitored by a speed sensor operatively associated with a rotating part in the vehicle drive train that rotates in proportion to vehicle ground speed, to create a ground speed signal. The selectable set speed signal can be input to microcontroller memory by driving the vehicle at a desired ground speed and then activating a speed set switch. By activating the speed set switch, the speed sensor inputs the current ground speed to the microcontroller memory. The speed control algorithm of the microcontroller thereafter compares the set speed to the ground speed signal from the speed sensor and corrects the control signal to the proportional valve to correct hydrostatic transmission speed output. Additionally, a speed increase/decrease switch is provided to manually increment the set speed, by an amount proportional to the set speed.

The hydrostatic transmission includes a variable displacement pump providing variable volume flow rate of a pressurized hydraulic fluid. The pump has an angularly adjustable swashplate, pump displacement being set by the angle of the swashplate. At least one proportional control valve is operatively connected to the swashplate to change the angle of the swashplate, the control valve being signal-connected to the output of the microcontroller. A hydraulic motor receives the pressurized hydraulic fluid from the pump to rotate the hydraulic motor.

The hydraulic motor is operatively connected to the rotating part of the drive train, preferably a gear, in order to rotate the part by rotary power from the hydraulic motor. The speed sensor is arranged to sense rotation of the part, the sensor being signal-connected to the microcontroller to send a rotation speed signal, or a stream of pulses, to the microcontroller. The microcontroller controls the proportional control valve to change the angular position of the swashplate in response to a difference, calculated by the microcontroller, between the rotation speed signal and the set speed.

A method of controlling the speed of a utility vehicle is set forth. The method includes the steps of: continuously sensing the rotational speed of a rotating part in a transmission of the vehicle; operating the vehicle at a desired ground speed; at the desired ground speed, selecting the rotational speed as a set speed; and if the rotational speed of the rotating part differs from the set speed, changing the transmission output to diminish the difference.

The preferred embodiment speed control system of the invention uses speed control foot pedals with potentiometer sensors, a Hall effect sensor that measures the speed of a gear in the final drive of the transmission, on/off and selector switches, and a programmed microcontroller having a speed control algorithm and memory means.

The operation of the preferred embodiment cruise control function is as follows: an on/off switch is positioned to activate the use of the cruise control function in the microcontroller software. Using the foot pedal controls on the vehicle, the operator drives the vehicle to the speed desired for the specific task. Once at the desired ground speed, a second switch is momentarily depressed and the microcontroller records the speed of a rotary part, e.g., a gear, present in the transmission that rotates proportionally to ground speed, as a set speed. The set speed is sensed by the Hall effect pulse pickup unit located adjacent to the rotating part, and is recorded in memory in the microcontroller. The current being supplied to proportional valves used to control the swashplate angle of the variable displacement pump is recorded in the memory of the microcontroller at the same time. Using the recorded current as a starting point, the control current to the proportional valves that control transmission output is modulated via a control algorithm to maintain the set speed of the vehicle. The algorithm monitors the speed signal from the Hall effect pulse pickup unit and increases or decreases the control current to the proportional valves using the error between the set speed and the actual speed signal from the pulse pickup unit.

While in cruise control mode, the set speed can be incremented up and down in steps by depressing momentary switches. For each depression of the switch, the microcontroller responds by changing the set speed by a percentage of the current set speed. This percentage is adjustable in the microcontroller software. Changing the speed by a percentage provides small speed changes when the vehicle set speed is slow and larger speed changes at higher vehicle set speeds. This is an advantageous feature of the invention. Slow operations generally require small speed adjustments, but larger speed adjustments are typically desired while transporting at higher speeds on the road.

The invention provides a cruise control for hydrostatic transmissions that does not require swashplate position feedback. By using a transmission speed signal to represent ground speed, and the speed signal to create a set point speed, and using feedback control, the set speed and feedback control are independent of engine speed changes and transmission efficiency changes caused by vehicle load changes.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

While this invention is susceptible of embodiment in many different forms, there are shown in the drawings, and will be described herein in detail, a specific embodiment thereof with the understanding that the present disclosure is to be considered as an exemplification of the principles of the invention and is not intended to limit the invention to the specific embodiment illustrated.

Figure 1:
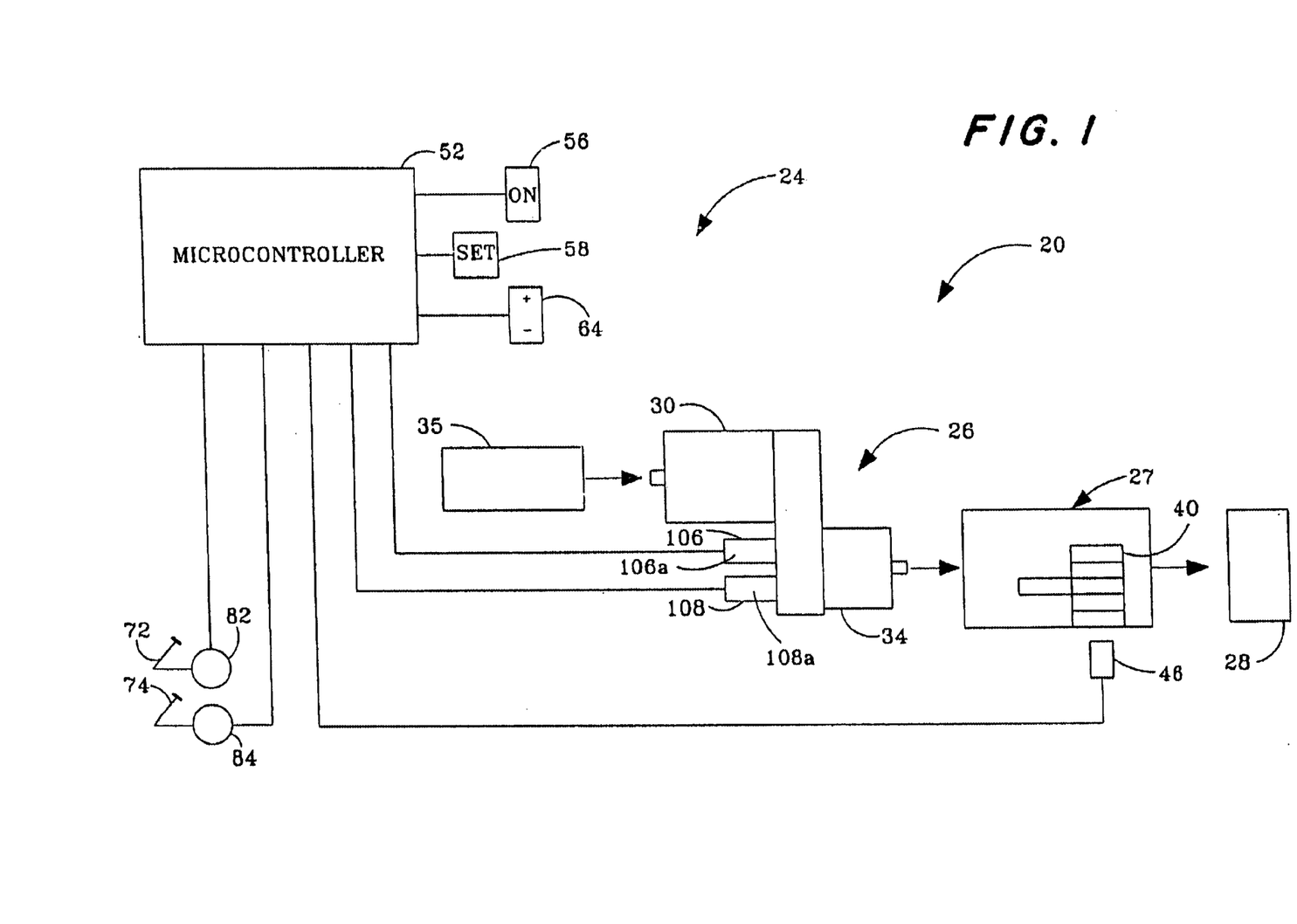
FIG. 1 is a block diagram of a utility vehicle cruise control system of the present invention.

FIG. 1 illustrates, in block diagram form, a vehicle 20 incorporating a preferred embodiment drive control system 24 of the present invention. The vehicle incorporates a hydrostatic transmission 26 and a range transmission 27, such as a multi-speed gear transmission to, for transmitting power through a differential (not shown) to one or more driven wheels 28.

The hydrostatic transmission 26 includes a variable displacement pump 30, and a hydraulic motor 34. An engine drive 35 rotationally drives the variable displacement pump 30. The hydraulic motor drives the multi-gear transmission drive 27 interposed between the hydraulic motor 34 and the driven wheel 28. The range transmission 27 includes a transmission gear 40. A transmission speed pickup 46, such as a Hall effect sensor, is located in close proximity to the transmission gear 40.

The control system 24 includes a controller, such as a microprocessor-based microcontroller 52, in signal-communication with a cruise control on/off switch 56 and a set switch 58. The on/off switch 56 enables/disables the cruise control algorithm of the microcontroller 52, and the set switch 58 is selectively activated to activate the cruise control algorithm in the microcontroller, as described hereinafter. The microcontroller 52 is also in signal-communication with an increase/decrease speed switch 64, the operation of which will be described hereinafter.

The control system 24 includes a forward pedal 72 and a reverse pedal 74. The forward pedal 72 is operatively engaged with a potentiometer 82 to produce a forward pedal position signal, and a reverse pedal 74 is operatively engaged with a potentiometer 84 to produce a reverse pedal position signal. The potentiometers 82, 84 are signal-connected to the controller 52.

The controller 52 is signal-connected, through appropriate signal conditioning or amplifying circuitry (not shown), to a solenoid 106a of a forward drive proportional pressure control valve 106 and to a solenoid 108a of a reverse drive proportional pressure control valve 108. The output current to energize the forward or reverse control valve solenoids 106a, 108a is substantially proportional to the corresponding pedal position signal.

Figures 2, 3, 3A:
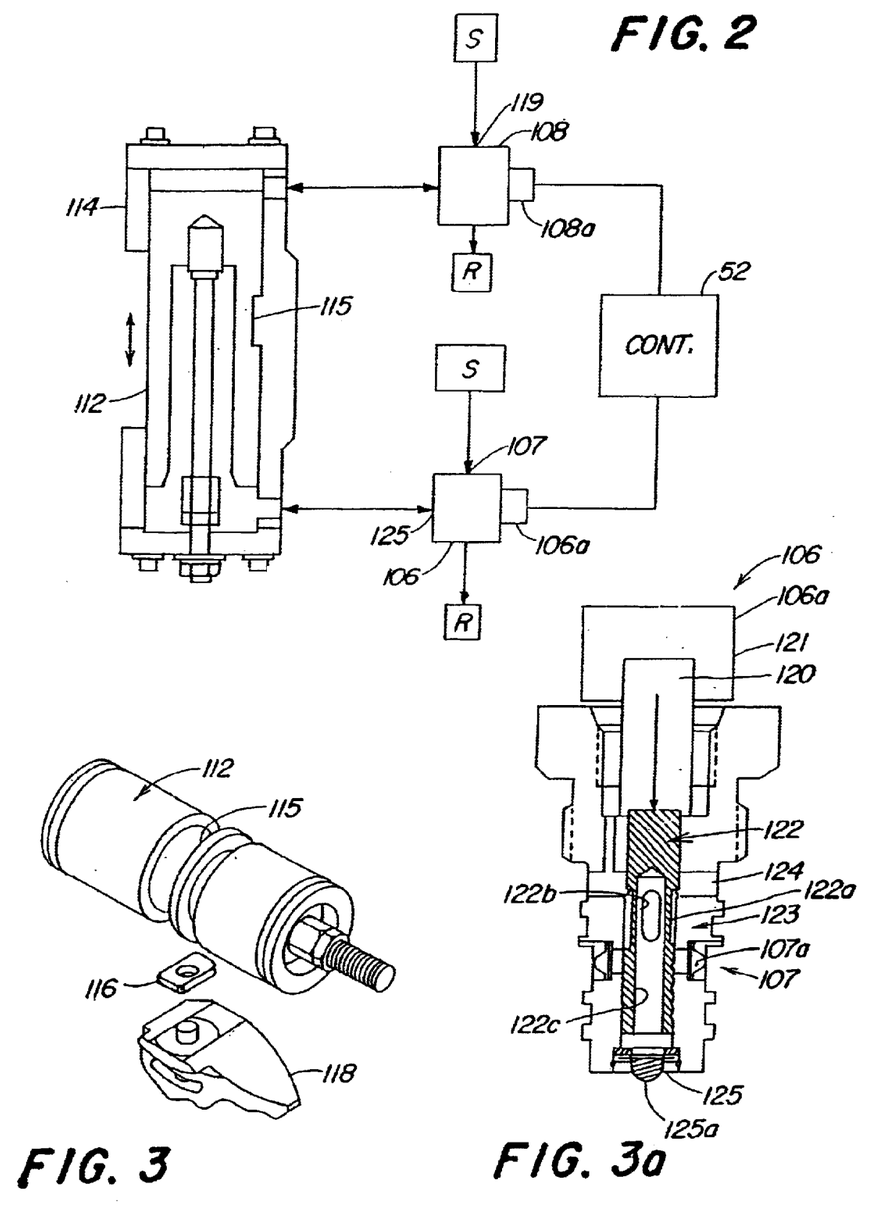
FIG. 2 is a schematic sectional view of the servo control system used in a hydrostatic transmission of FIG. 1.
FIG. 3 is an exploded, fragmentary perspective view of the servo control system of FIG. 2.
FIG. 3A is a schematic sectional view of a proportional pressure control valve of the system of FIG. 3.

FIGS. 2 and 3 illustrate the hydrostatic transmission servo control in more detail. Given an engine drive speed and a range transmission or final drive gear selection, the hydrostatic transmission provides infinitely variable speed control, forward and reverse, by operation of the foot pedals 72, 74. Each valve 106, 108 is connected to a source of pressurized hydraulic fluid S and a return channel R that is at a reduced hydraulic pressure. Preferably, the return channel R directs the hydraulic fluid back to the reservoir of the vehicle.

Depressing the forward foot pedal 72 causes an electrical output signal or voltage of the potentiometer 82 to be transmitted to the controller 52. The controller 52, through software, generates a pre-selected current ramp output, to energize the solenoid 106a of the forward drive proportional valve 106. The proportional valve 106 is opened according to the ramp output, allowing pressurized hydraulic fluid, fed from the source S into the inlet 107 of the valve 106, to flow through the valve 106. The pressurized hydraulic fluid is communicated into, and pressurizes, a servo cylinder 114 on one side of a servo piston 112 that is slidably housed in the cylinder 114. The other valve 108 allows fluid to flow from within the cylinder 114, from an opposite side of the servo piston 112, to the return channel R.

The piston 112 has a notch 115 that holds a piston follower 116 (FIG. 3). The piston follower 116 controls movement of a variable displacement pump cam plate or swashplate 118. Movement of the piston 112 causes the cam plate 118 in the hydraulic pump to rotate out of the neutral position. Maximum displacement of the pump 30 is attained when the servo piston 112 is moved to its extreme position. The cam plate 118 can be positioned in a range of forward positions selected by the foot pedal 72.

When the reverse pedal 74 is pressed, the potentiometer 84 sends an electrical output signal or voltage to the controller 52. The controller 52, through software, generates a pre-selected current output ramp to energize the solenoid driver 108a of the reverse drive proportional valve 108. The reverse drive proportional valve 108 is opened, according to the ramp output, to allow pressurized hydraulic fluid, fed into an inlet 119 of the valve 108 from the source S, to flow through the valve 108. The pressurized hydraulic fluid is communicated into, and pressurizes the servo cylinder 114 on an opposite side of the servo piston 112 within the cylinder 114. The other valve 106 is controlled to allow fluid to flow from within the cylinder 114, from the one side of the servo piston 112, to the return channel R.

Preferably, the valve solenoids 106a, 108a are driven by pulse width modulation type current signals and produce controlling pressure proportional to the controlled width of step pulses of current applied to the solenoid drivers. While the frequency of the pulses remains substantially the same, the pulse widths are changed to modulate the valves.

The hydrostatic system is preferably a closed loop fluid power system that consists of a charge pump (not shown), and the variable displacement pump 30, which is driven by a flex plate/dampener assembly (not shown) connected to the engine flywheel. The charge pump provides pressurized fluid to the proportional valve inlets 107, 119. Return fluid from the servo control unit is routed to the reservoir of the vehicle.

An exemplary example of a control valve, such as the control valve 106, is illustrated in FIG. 3A. The solenoid 106a includes a plunger 120 (shown schematically) driven by the solenoid coil 121 (shown schematically). The plunger 120 drives a valve spool 122 within a housing 123. The housing provides the pressurized hydraulic fluid inlet 107, in the form of plural openings, and an outlet 124, in the form of plural openings, to the hydraulic fluid reservoir. A control pressure outlet 125 communicates hydraulic fluid at a modulated pressure to the servo cylinder 114 as shown in FIG. 2. The solenoid coil 121 drives the plunger 120 downward (in FIG. 3A) to open the inlet 107 to the outlet 125 through an annular channel 122a.

The channel 122a is open to an oblong orifice 122b through the spool 122 to communicate fluid into an interior 122c of the spool. The interior of the spool is open to the outlet 125. The pressure of the hydraulic fluid at the control outlet 125 is substantially proportional to the force applied to the spool by the plunger, ranging between reservoir pressure, the pressure at the outlet 125 with the inlet 107 closed, as shown in FIG. 3A, to pressurized hydraulic fluid supply pressure, the spool 122 moved down to close the outlet 124 and open the inlet 107.

An annular screen 107a and a circular screen 125a can be supplied to the inlet 107 and to the outlet 125 respectively.

The control valve 108 can be identically configured as described above for the control valve 106.

Figure 4:
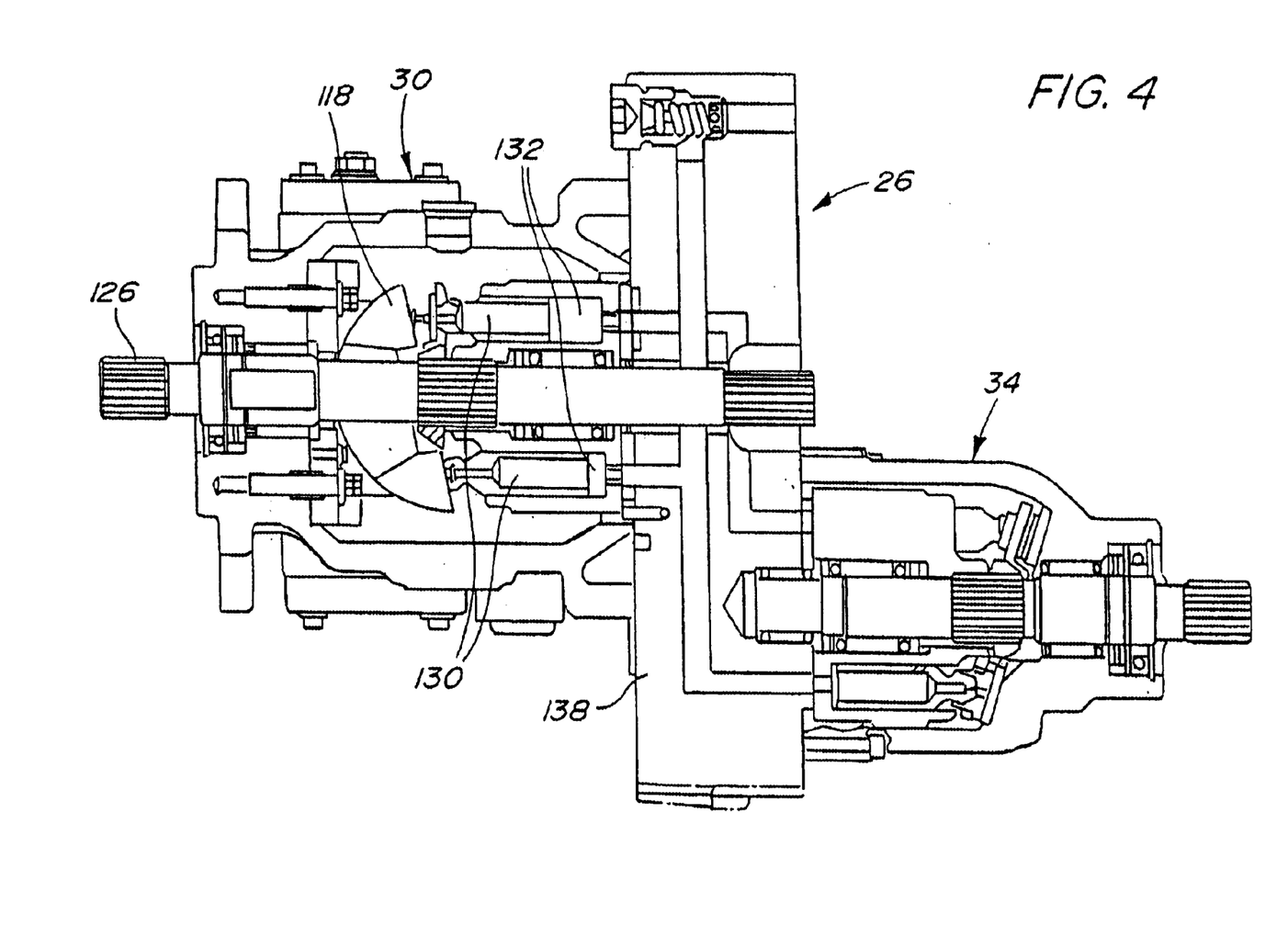
FIG. 4 is a schematic sectional view of a hydrostatic transmission.

FIG. 4 illustrates the hydrostatic transmission 26 in more detail. The hydrostatic pump 30 illustrated is an axial piston, servo controlled, variable displacement piston pump. Input shaft splines 126 are driven via a flex plate (not shown) bolted onto the engine flywheel (not shown).

Fluid flow through the pump 30 is controlled by changing the angle of the swashplate 118. The location, off center, of the cam plate controls the distance the pistons 130 travel inside the piston bores 132 of the rotating assembly. The direction that the cam plate is rotated from center determines the direction of fluid flow (forward or reverse). The number of degrees the cam plate is deflected determines how much fluid will be displaced, i.e., controlling transmission speed.

The hydrostatic pump 30 provides hydraulic fluid to the hydrostatic motor 34 through the back plate 138. Hydraulic fluid in the power train circulates in a closed loop. Fluid leaves the hydrostatic pump 30, flows through the hydrostatic motor 34, and is returned to the hydrostatic pump. Fluid that leaves this closed loop circuit, such as to the case drain, is replenished by fluid from the charge pump.

The hydrostatic motor 34 is a high torque axial piston motor. The motor is located on the rear of the back plate. The hydrostatic motor drives an output shaft coupled to the range transmission 27 that transfers power to the wheels. The range transmission 27 can be a multi-speed range gear transmission, such as a three-speed or four-speed gearbox.

The cruise control system 24 of the invention can be activated by pushing the on/off switch 56 and then operating the vehicle to the desired ground speed and then activating the set switch 58 to select the desired set speed. The speed control algorithm of the microcontroller 52 thereafter will control the set speed using a PID routine as described below with regard to FIGS. 5 and 6. If it is desired to increase or decrease the set speed by a preselected percentage, an increase/decrease speed switch 64 can be activated to incrementally increase or decrease the set speed as described below with regard to FIG. 7.

Figure 5:
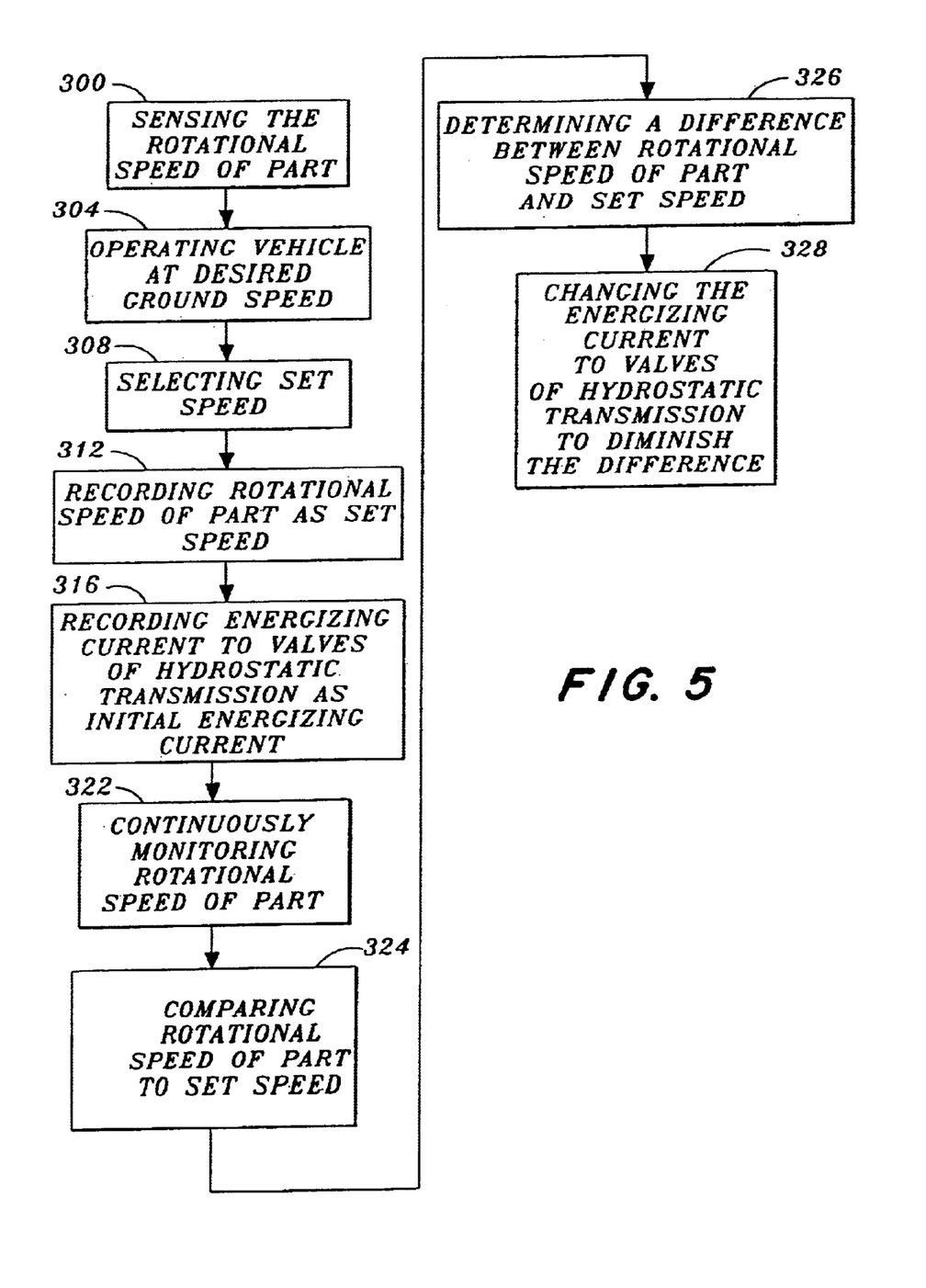
FIG. 5 is a block diagram of the cruise control algorithm steps of the present invention.

A method of controlling the speed of a utility vehicle is set forth in FIG. 5. The method includes the steps of: step 300, continuously sensing the rotational speed of a rotating part in a range transmission of the vehicle; step 304, operating the vehicle at a desired ground speed; step 308, at the desired ground speed, selecting the rotational speed as a set speed; step 312, recording the rotational speed of the part as a set speed; step 316, recording the energizing current to the proportional control valves of the hydrostatic transmission as an initial energizing current; step 322, monitoring the rotational speed of the rotating part; step 324, comparing the rotational speed to the set speed; step 326, determining a difference between the rotational speed and the set speed; and step 328, if the rotational speed of the rotating part differs from the set speed, using a correction algorithm routine to change the energizing current to the proportional control valves of the hydrostatic transmission to change the transmission speed output to diminish the difference.

Figure 6:
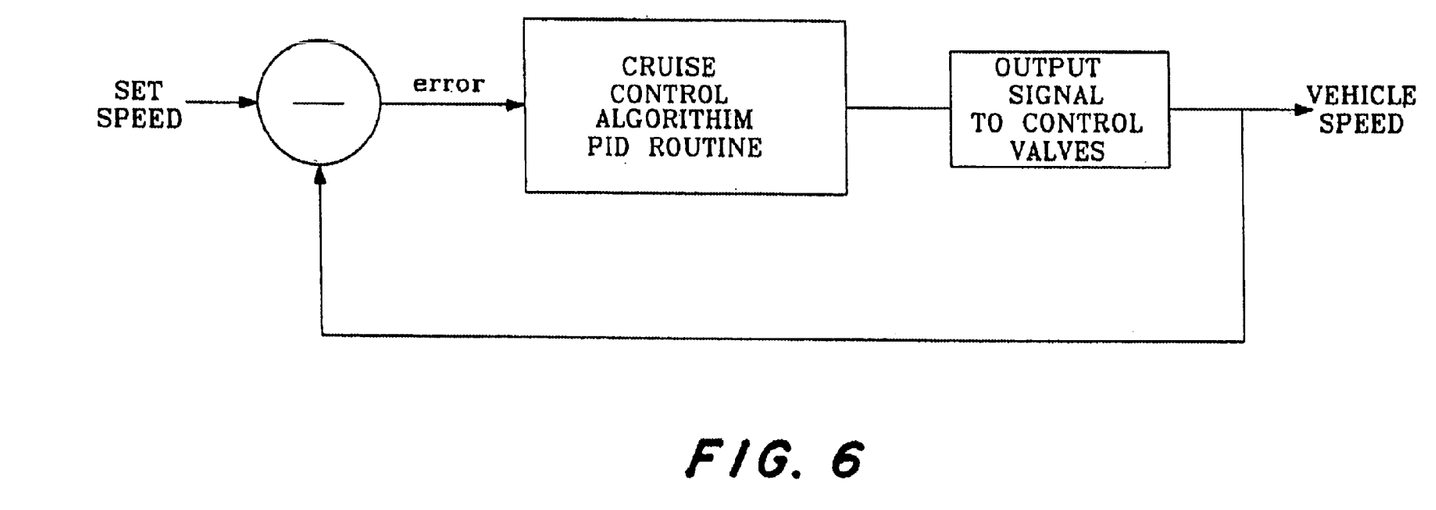
FIG. 6 is a block diagram of a speed control algorithm routine incorporated into the present invention.

FIG. 6 illustrates a control algorithm routine of the software of the microcontroller 52 which compares the ground speed as sensed by the Hall effect pickup unit 46 to the set speed recorded in memory of the microcontroller and which uses PID (proportional, integral, derivatives) feedback control mathematics to diminish the difference by controlling the speed output of the hydrostatic transmission. The routine changes the output signal from the microcontroller to the proportional control valves to reduce or increase the hydrostatic transmission speed output.

The cruise control function can be turned off by: 1. depressing the brakes; 2. depressing the reverse foot pedal;

3. turning off the switch that activates cruise control; 4. repeatedly depressing the switch to decrement the speed set point below the lowest set point allowed by the software.

To resume to the previously set speed, the operator must first initiate some forward motion using the normal foot pedal controls. The increase/decrease switch 64 also functions as the resume switch when the cruise control function is in the turned off mode. Once moving, the operator can then momentarily depress the switch 64 and the microcontroller will control the vehicle speed to increase or decrease to the previous set speed using the cruise control algorithm in the microcontroller.

Figure 7:
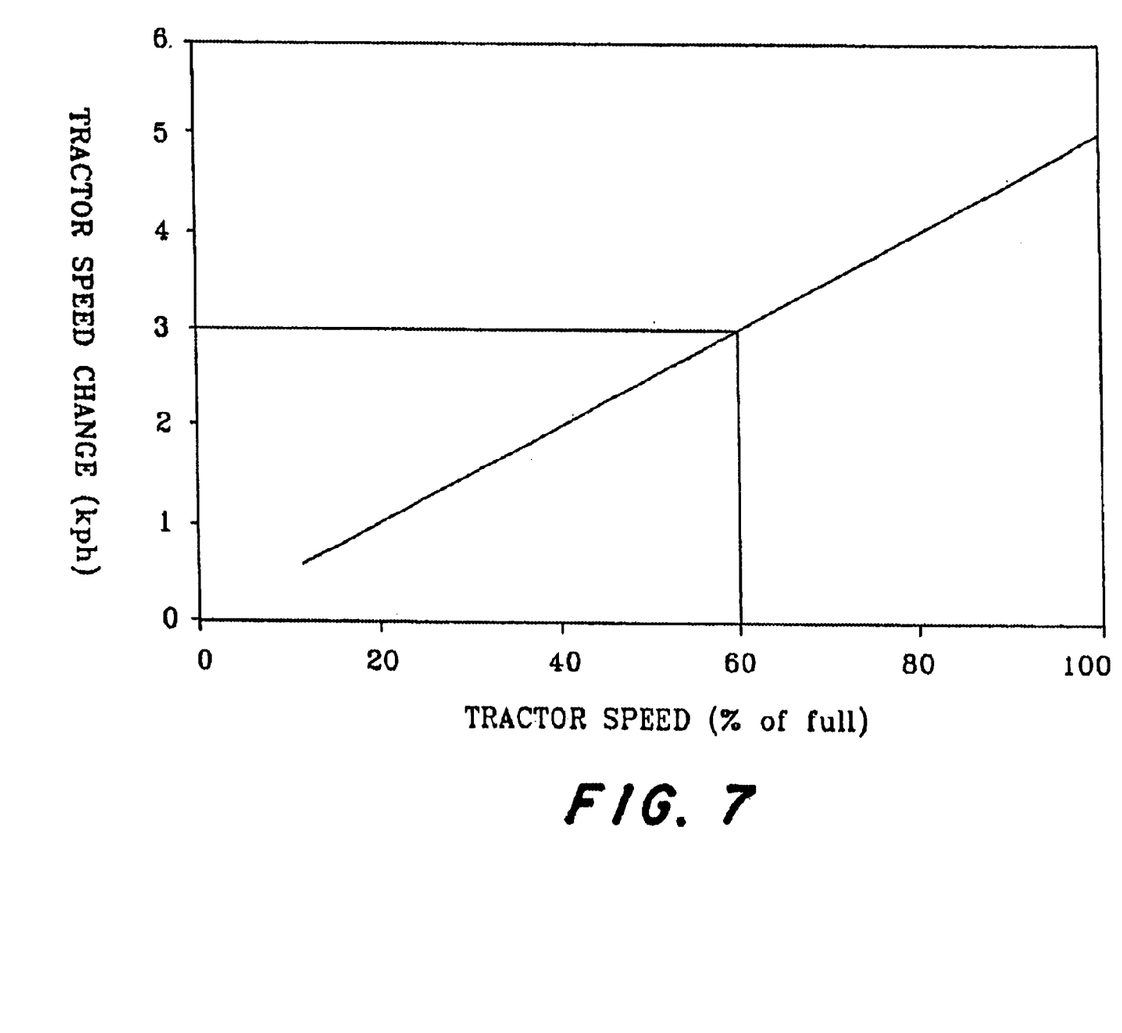
FIG. 7 is a speed change diagram demonstrating the operation of the present invention.

FIG. 7 illustrates the proportional relationship between the vehicle speed and the vehicle speed change for manually selected increment/decrement speed change steps. Using the speed selector switch 64, the cruise control set speed can be manually increased or decreased incrementally by a percentage of the current set speed. For slower speeds, the incremental speed change caused by activating the momentary switch will be a preselected percentage of such lower speed, in effect, a small speed change. For greater speeds the incremental speed change caused by activating the momentary switch will also be the preselected percentage applied to the greater set speed, in effect, a relatively large speed change. This relationship is important because at low speeds, such as for inching control, the speed changes required are correspondingly small. For highway travel, the speed changes required are correspondingly larger.

For example, as shown in FIG. 7, with the set speed set at 60 percent of full tractor speed, an activation of the switch 64 for either increase or decrease in the set speed, results in a speed change, plus or minus, of about 3 kph. With the set speed set at 100 percent of full tractors speed, an activation of the switch 64 for either increase or decrease in the set speed, results in a speed change, plus or minus, of about 5 kph.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A speed control system for a utility vehicle, comprising:
   a controller having an input for receiving a selectable set speed signal;
   an input device responsive to an operator command to select said selectable set speed signal, said input device signal-connected to said input;
   a variable displacement pump providing a pressurized hydraulic fluid, said pump having an angularly adjustable swashplate, pump displacement set by the angle of the swashplate;
   a proportional pressure control valve operatively connected to said swashplate to change the angle of said swashplate, said control valve signal-connected to said controller;
   a hydraulic motor receiving the pressurized hydraulic fluid from the pump to rotate the motor;
   a part operatively connected for rotation by the hydraulic motor;
   a rotation sensor arranged to sense rotational speed of said part, said sensor signal-connected to said controller to send a rotational speed signal to said controller;
   said controller controlling said proportional control valve with a control signal, said controller changing the angular position of said swashplate in response to a difference calculated by said controller between said rotational speed signal and the set speed signal; and
   an incremental speed switch signal-connected to said controller, each activation of said incremental speed switch causing said controller to increase said set speed signal by an amount that is a function of said set speed signal, said amount being lesser for a range of lesser set speed signals and greater for a range of greater set speed signals.

2. The speed control system according to claim 1, wherein each activation of said incremental speed switch causes said controller to increase the set speed signal by an amount proportional to the set speed signal.

3. The speed control system according to claim 1, wherein alternate activation of said incremental speed switch causes said controller to decrease the set speed signal by an amount proportional to the set speed signal.

4. The speed control system according to claim 1, wherein said part comprises a gear and said sensor comprises a Hall effect pickup sensor arranged adjacent said gear to sense pulses of rotating teeth of said gear.

5. The speed control system according to claim 1, comprising forward and reverse proportional pressure control valves, and a servo piston mechanically connected to said swashplate, said forward and reverse proportional pressure control valves operable to relatively pressurize one side of said servo piston to move said servo piston and cause corresponding movement of said swashplate.

6. The speed control system according to claim 1, wherein said input device comprises a speed set switch and said controller includes a memory, said memory for instantaneously recording said rotational speed signal and said control signal upon switch actuation of said speed set switch.

7. The speed control system according to claim 1, wherein said input device comprises a switch and a circuit configured to import the rotational speed signal as a set speed signal when said switch is activated.

8. The speed control system according to claim 1, wherein alternate activation of said incremental speed switch causes said controller to decrease the set speed signal by an amount that is a function of said set speed signal, said amount being lesser for a range of lesser set speed signals and greater for a range of greater set speed signals.

9. A method of controlling the speed of a utility vehicle, said vehicle having an engine driving a hydrostatic transmission, said hydrostatic transmission driving a drive train, said drive train including at least one gear and a driven wheel, comprising the steps of:
   continuously sensing a rotational speed of a rotating part in the drive train;
   operating said vehicle at a desired vehicle speed;
   at the desired vehicle speed, selecting the rotational speed as a set speed and saving said set speed in memory;
   thereafter, if the rotational speed of the rotating part differs from the set speed, changing the hydrostatic transmission output to diminish the difference; and
   providing a manual step of changing said set speed by incremental amounts and activating said manual step to change the set speed by an amount that is a function of the set speed, said amount being lesser for a range of lesser set speeds and greater for a range of greater set speeds.

10. The method according to claim 9, wherein the hydrostatic transmission includes a variable displacement pump, said variable displacement pump including a swashplate which can be angularly adjusted to adjust the hydrostatic transmission output, and a proportional pressure control valve signal-actuated to adjust swashplate angle, wherein the step of changing the hydrostatic transmission output is further defined by a step of changing a driving signal to the proportional control valve to change the angle of the swashplate in the variable displacement pump of the hydrostatic transmission.

11. The method according to claim 9, wherein said manual step of changing said set speed by incremental amounts changes the set speed by a percentage of the set speed.

12. The method according to claim 10, comprising the further step of:
  at the desired vehicle speed, when said rotational speed is selected as the set speed, saving said driving signal to the proportional control valve as an initial driving signal, and thereafter, if the rotational speed of the rotating part differs from the set speed, changing the driving signal to diminish the difference between the rotational speed and the set speed.

13. A speed control system for a utility vehicle, comprising:
  a controller having an input for receiving a selectable set speed signal;
  an input device responsive to an operator command to select said selectable set speed signal, said input device signal-connected to said input;
  a drivetrain responsive to said controller to increase or decrease ground speed of said vehicle;
  a ground speed sensor arranged to sense ground speed of said vehicle, said sensor signal-connected to said controller to send a ground speed signal to said controller;
  said controller controlling said drivetrain with a control signal, said control signal adjustable to increase or decrease ground speed in response to a difference calculated by said controller between said ground speed signal and the set speed signal; and
  an incremental speed switch signal-connected to said controller, each activation of said incremental speed switch causing said controller to increase said set speed signal by an amount that is a function to said set speed signal, said amount being lesser for a range of lesser set speed signals and greater for a arrange of greater set speed signals.

14. The speed control system according to claim 13, further comprising a further incremental speed switch signal-connected to said controller, each activation of said further incremental speed switch causing said controller to decrease the set speed signal by an amount that is a function of said set speed signal, said amount being lesser for a range of lesser set speed signals and greater for a arrange of greater set speed signals.

15. The speed control system according to claim 14, wherein said input device comprises a speed set switch and said controller includes a memory, said memory for instantaneously recording said ground speed signal and said control signal upon switch actuation of said speed set switch.

16. The speed control system according to claim 14, wherein each activation of said incremental speed switch causing said controller to decrease the set speed signal by an amount proportional to the set speed signal.

17. The speed control system according to claim 13, wherein said input device comprises a speed set switch and said controller includes a memory, said memory for instantaneously recording said ground speed signal and said control signal upon switch actuation of said speed set switch.

18. The speed control system according to claim 13, wherein said input device comprises a switch and a circuit configured to import the ground speed signal as a set speed signal when said switch is activated.

19. The speed control system according to claim 13, wherein each activation of said incremental speed switch causing said controller to decrease the set speed signal by an amount proportional to the set speed signal.

* * * * *